No. 735,120. PATENTED AUG. 4, 1903.
G. W. LILLEY.
LAND ROLLER.
APPLICATION FILED JULY 17, 1902.
NO MODEL. 2 SHEETS—SHEET 2.

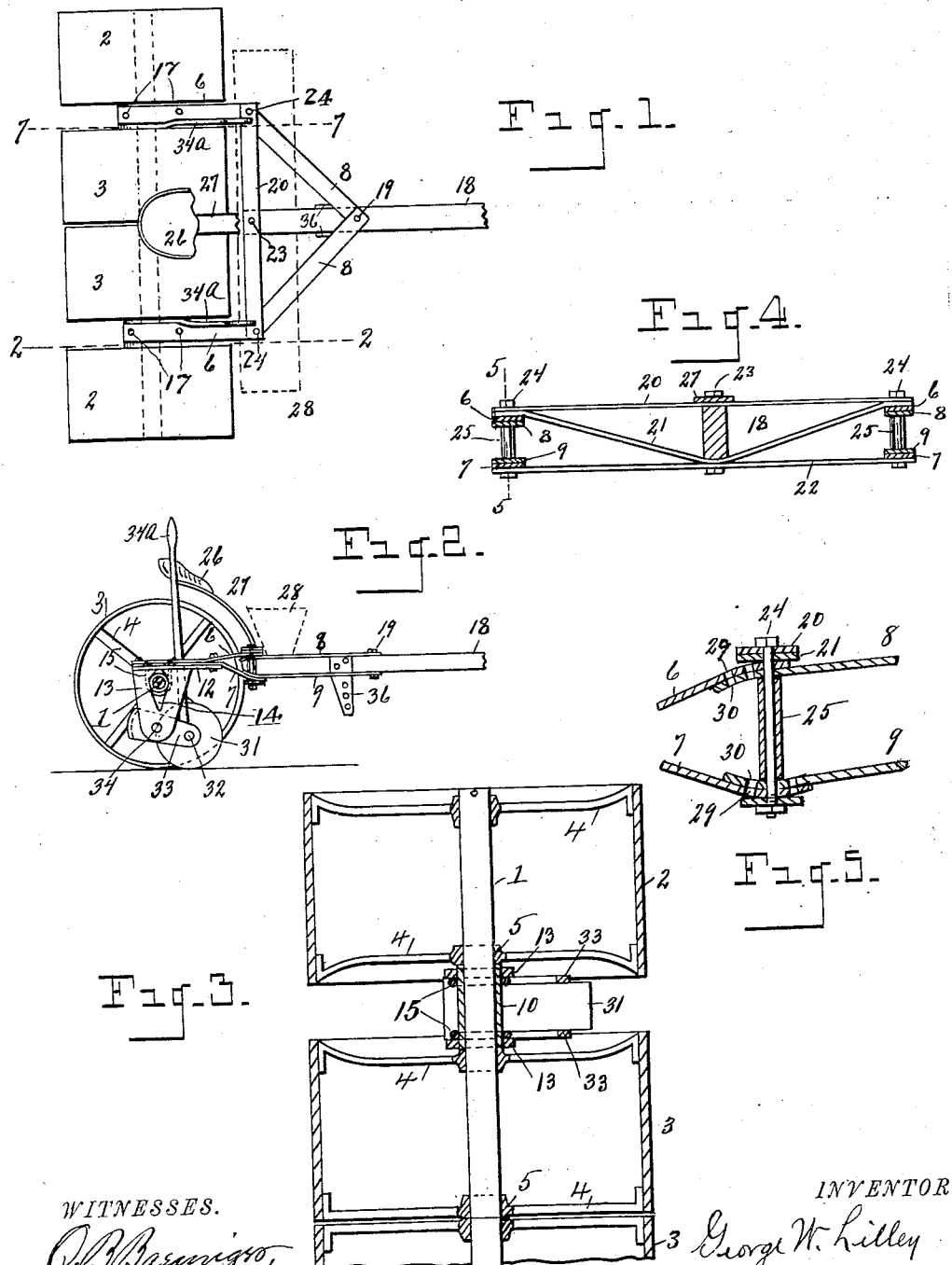

WITNESSES. INVENTOR.
George W. Lilley,
By R. B. Wheeler & Co.
Attorneys.

THE NORRIS PETERS CO., PHOTO-LITHO., WASHINGTON, D. C.

No. 735,120. Patented August 4, 1903.

UNITED STATES PATENT OFFICE.

GEORGE W. LILLEY, OF LAPEER, MICHIGAN.

LAND-ROLLER.

SPECIFICATION forming part of Letters Patent No. 735,120, dated August 4, 1903.

Application filed July 17, 1902. Serial No. 115,898. (No model.)

*To all whom it may concern:*

Be it known that I, GEORGE W. LILLEY, a citizen of the United States, residing at Lapeer, in the county of Lapeer, State of Michigan, have invented certain new and useful Improvements in Land-Rollers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to land-rollers; and it consists in the construction and arrangement of parts hereinafter fully set forth, and pointed out particularly in the claims.

The object of the invention is to produce a land-roller of comparatively simple and inexpensive construction in which the arrangement is such as to enable the ground to be perfectly rolled, to provide for raising the roller upon transporting-wheels when desired to move it from place to place, to provide for supplying additional weight when required, and to provide for an adjustment which allows of a tilting of the seat and draft-irons rearwardly, so as to relieve the tongue in cases where additional weight upon the roller is necessary.

The above object is attained by the structure illustrated in the accompanying drawings, in which—

Figure 6:
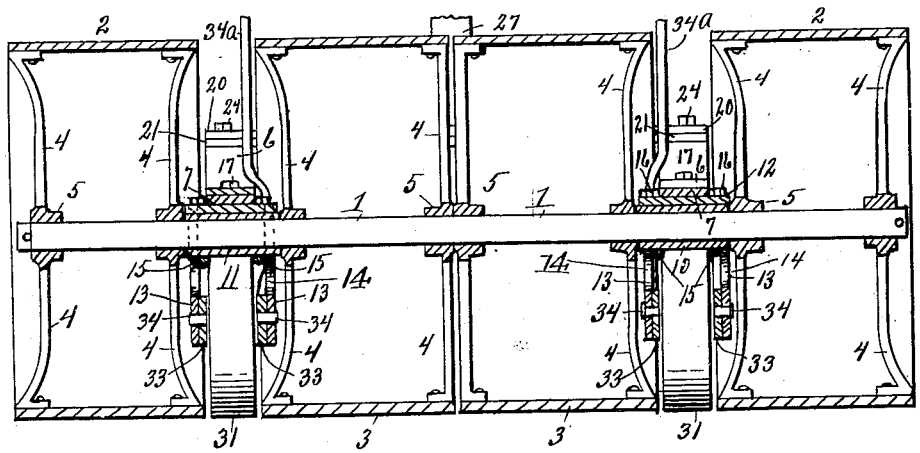
Figure 8:
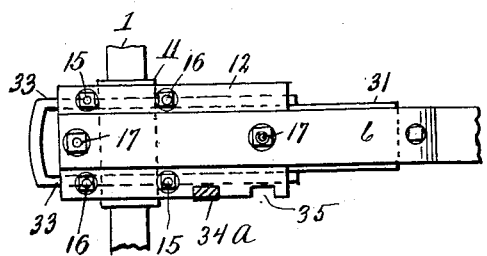
Figure 7:
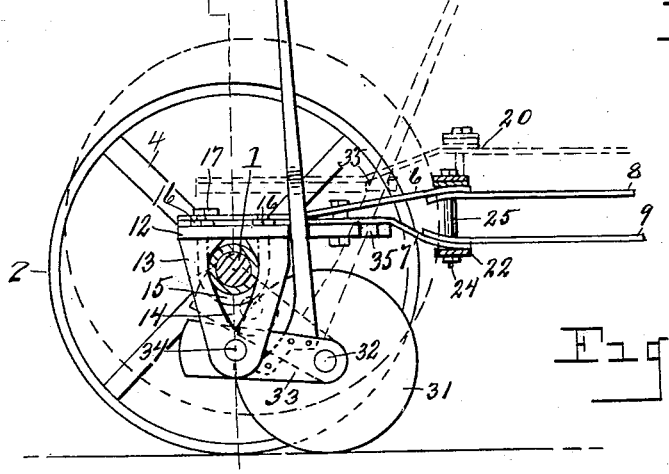

Figure 1 is a plan view of a land-roller involving my invention, portions of the tongue being broken away. Fig. 2 is a transverse section, as on line 2 2 of Fig. 1. Fig. 3 is a horizontal section through one end of the roller, showing the end sections thereof and one of the transporting-wheels interposed between said sections. Fig. 4 is a transverse section through Fig. 1. Fig. 5 is a sectional view through the adjustable connection between the draft-irons and the tongue-irons, as on line 5 5 of Fig. 4. Fig. 6 is a vertical longitudinal section through the roller, as on line 6 6 of Fig. 7. Fig. 7 is a transverse section on line 7 7 of Fig. 1. Fig. 8 is an enlarged plan view in detail of one of the plates carrying the box in which the shaft of the roller is journaled and showing the draft-irons bolted thereto and the operative lever in horizontal section.

Referring to the characters of reference, 1 designates the axle upon which the roller is mounted. The roller instead of being formed integral is made up of a plurality of sections, preferably four, comprising the end sections 2 and the middle sections 3. The rims of the roller-sections are supported by the radial arms or spokes 4, which carry the central hubs 5, through which the axle passes.

In order to effect simplicity of construction and economy in building this improved roller, no frame is employed; but instead the draft-irons 6 and 7, to which the tongue-irons 8 and 9 are attached, are connected directly to the axle, passing between the outer and inner sections of the rollers, which are separated for this purpose. In order to facilitate the attachment of the draft-irons to the axle, the boxes 10 and 11 are slipped upon the axle between the outer and inner sections of the roller. Above the boxings are the horizontal iron plates 12, having on each side a depending bracket 13, provided with the opening 14, through which the axle and boxes pass. The boxes are secured in the apertures of the brackets by means of the staple-bolts 15, which embrace the boxes upon the inner sides of the brackets and pass through the plates 12, receiving upon the upper ends the nuts 16, whereby by tightening the nuts the boxes may be clamped in the angular openings 14 in the brackets and maintained in place, allowing the axle to rotate within said boxes. The draft-irons 6 and 7, which are preferably flat steel bars, are bolted onto the upper face of the plates 12 by means of the bolts 17, and their outer ends are separated, as shown in Figs. 2, 5, and 7, to receive the irons 8 and 9, which lead to the tongue 18 and are secured to the upper and lower faces thereof, respectively, by the bolt 19. The tongue-irons extend obliquely from the tongue to the draft-irons and brace the tongue against lateral movement.

Crossing transversely between the ends of the draft-irons at the point of junction of the tongue-irons therewith is a truss-beam (shown in Fig. 4) comprising the upper bars 20 and 21, the latter of which is bent downwardly to receive the end of the tongue between said bars, and the lower bar 22, which crosses below the tongue and all of which are secured to the tongue by the bolt 23, which passes therethrough. The opposite ends of the upper bars 20 and 21 of the truss-beam extend onto the draft-irons 6, as shown in Fig. 5, and the ends of the lower bar 22 cross under the draft-irons 7. The bars of the truss-beam are united to the draft-irons and tongue-irons by the vertical bolts 24, which pass through said parts and through the sleeve 25, which surrounds said bolts between the tongue-irons. By this arrangement it will be seen that a joint is formed between the draft-irons and the tongue-irons which is capable of adjustment, so that the seat 26, which is mounted on the rear of the tongue and on the cross-beam by means of the spring-bar 27, may be tilted rearwardly, so as to throw more of the weight of the rider onto the axle and relieve the weight upon the tongue when it is found necessary to fill the stone-box 28. (Shown by dotted lines in Figs. 1 and 2.) The adjustment just described is accomplished through the medium of the registering apertures 29 and 30, formed in the opposed curved faces of the draft-irons and tongue-irons at their point of junction, as shown in Fig. 5, and through which the bolts 24 are adapted to pass. By withdrawing said bolts and shifting said irons so as to raise or lower the end of the tongue the seat may be tilted as desired and the parts again secured by reinserting said bolts.

While I have shown the draft-irons and the tongue-irons joined thereto to allow of an adjustment of said parts, I do not wish to be limited to said particular construction, as I may desire in some instances to employ a rigid bar extending from the tongue to the plates 12 upon the axle.

In order to fill the gaps between the end sections of the roller caused by the separating of said sections to allow the entrance of the draft-irons between them, the small supplementary rollers 31 are employed, which are of such width as to fill the gap between the separated sections of the roller at the ground-line. These supplementary rollers are journaled upon the journal-pins 32 in the sides of the forks 33, which are in turn journaled at 34 to the depending brackets 13 of the plates 12. These supplementary rollers interposed between the separated sections of the large roller serve to fill the space between them and at the same time may be employed as transporting-rollers when it is desired to move the land-roller from place to place. When employed as transporting-rollers, said rollers 31 are thrown downwardly by means of the levers 34$^a$, which are attached to the forks 33 and by means of which said forks may be tipped downwardly, so as to raise the main roller, as shown by dotted lines in Fig. 7, said levers being locked in the notches 35 in the side of the plates 12 when moved in either position. When the levers are thrown forward, as shown by dotted lines in said Fig. 7, the two rollers 31 alone bear upon the ground, whereby the main roller is raised sufficiently above the surface to clear ordinary obstructions and in which position said roller may be easily transported.

Depending from the tongue 18 is the bracket 36, in which a clevis may be secured for the purpose of attaching the whiffletree, so that an upward draft may be exerted upon the tongue when desired to relieve the weight upon the neck-yoke.

Having thus fully set forth my invention, what I claim as new, and desire to secure by Letters Patent, is—

1. In a land-roller, the combination of the axle, the sectional roller mounted upon the axle, the tongue, the draft-irons connected to the tongue, boxes upon said axle between the sections of the roller, plates mounted upon said boxes having depending brackets through which said boxes pass, the rear ends of the draft-irons passing between the roller-sections and secured to said plates.

2. In a land-roller, the combination of the axle, the sectional roller mounted thereon, the draft-irons attached to the axle between the sections of the roller and a tongue with which said draft-irons are connected, supplementary rollers interposed between the separated roller-sections and adapted to fill the space between them at the ground-line.

3. In a land-roller, the combination of the axle, the tongue, the sectional roller, means connecting the axle with the tongue extending between the sections of the roller, supplementary rollers to fill the space between the separated sections of the main roller, and means for operating said supplementary rollers to raise and lower the main roller.

4. In a land-roller, the combination of the axle, the sectional roller mounted thereon, the tongue, the draft-irons connected to the axle and passing outwardly between the roller-sections, the tongue-irons attached to the tongue at their forward ends and adjustably connected at their rear ends to the draft-irons.

5. In a land-roller, the combination with the axle, the sectional roller mounted thereon, the end sections of the roller being separated from the middle sections, boxes interposed between the separated sections of the roller, draft-irons attached to said boxes and leading forward to the tongue, a plate mounted upon said boxes having depending brackets through which said boxes pass, forks pivoted to said brackets, supplementary rollers journaled in said forks, and levers attached to said forks for operating said supplementary rollers.

In testimony whereof I sign this specification in the presence of two witnesses.

GEORGE W. LILLEY.

Witnesses:
E. S. WHEELER,
C. E. DAVIS.